United States Patent
Kim et al.

(10) Patent No.: US 6,731,335 B1
(45) Date of Patent: May 4, 2004

(54) CMOS IMAGE SENSOR HAVING COMMON OUTPUTTING TRANSISTORS AND METHOD FOR DRIVING THE SAME

(75) Inventors: Hyun Eun Kim, Ichon-shi (KR); Hoai Sig Kang, Ichon-shi (KR)

(73) Assignee: Hyundai Electronics Industries Co., Ltd., Ichon-shi (KR)

(*) Notice: Subject to any disclaimer, the term of this patent is extended or adjusted under 35 U.S.C. 154(b) by 0 days.

(21) Appl. No.: 09/305,756

(22) Filed: May 6, 1999

(30) Foreign Application Priority Data

May 8, 1998 (KR) ............................................. 98-16536

(51) Int. Cl.[7] ................................................. H04N 3/14
(52) U.S. Cl. ........................ 348/308; 348/294; 348/302; 348/241
(58) Field of Search ................................ 348/294, 302, 348/303, 304, 308, 309, 241; 257/291, 292; 250/208.1

(56) References Cited

U.S. PATENT DOCUMENTS

| | | | |
|---|---|---|---|
| 4,573,076 A | | 2/1986 | Tisue et al. |
| 5,148,268 A | * | 9/1992 | Tandon et al. ............... 348/280 |
| 5,471,515 A | | 11/1995 | Fossum et al. ................ 377/60 |
| 5,521,640 A | | 5/1996 | Prater ......................... 348/273 |
| 5,539,461 A | | 7/1996 | Andoh et al. ................ 348/308 |
| 5,543,838 A | * | 8/1996 | Hosier et al. ................ 348/311 |
| 5,631,704 A | | 5/1997 | Dickinson et al. .......... 348/308 |
| 5,654,537 A | | 8/1997 | Prater ...................... 250/208.1 |
| 5,739,562 A | * | 4/1998 | Ackland et al. ............. 257/291 |
| 5,801,555 A | | 9/1998 | Kwon .......................... 327/94 |
| 5,841,126 A | | 11/1998 | Fossum et al. .......... 250/208.1 |
| 5,877,715 A | | 3/1999 | Gowda et al. ............... 341/122 |
| 5,880,691 A | | 3/1999 | Fossum et al. ............. 341/162 |
| 5,892,541 A | | 4/1999 | Merrill ....................... 348/302 |
| 5,973,311 A | * | 10/1999 | Sauer et al. ............. 250/208.1 |
| 6,091,449 A | | 7/2000 | Matsunaga et al. |
| 6,107,655 A | * | 8/2000 | Guidash ..................... 257/233 |
| 6,160,281 A | * | 12/2000 | Guidash ..................... 257/292 |
| 6,233,013 B1 | * | 5/2001 | Hosier et al. ............... 348/308 |
| 6,320,616 B1 | * | 11/2001 | Sauer ........................ 348/241 |
| 6,486,913 B1 | * | 11/2002 | Afghahi et al. ............. 348/308 |

FOREIGN PATENT DOCUMENTS

| | | | |
|---|---|---|---|
| EP | 0757476 A2 | 2/1997 | ............ H04N/3/15 |
| EP | 0813338 | 12/1997 | |
| EP | 09828103 | 7/1999 | |
| EP | 0954032 A2 | 11/1999 | ......... H01L/27/146 |
| GB | 2308267 A | 6/1997 | |
| JP | 11-312800 | 11/1999 | ......... H01L/27/146 |
| WO | WO97/07630 | 2/1997 | .......... H04N/5/335 |

* cited by examiner

*Primary Examiner*—Wendy R. Garber
*Assistant Examiner*—Justin Misleh
(74) *Attorney, Agent, or Firm*—Jacobson Holman PLLC

(57) ABSTRACT

The present invention provides a CMOS (Complementary Metal Oxide Semiconductor) image sensor including a unit pixel, wherein the unit pixel includes photodiodes for receiving incident light and for generating photo charges, single sensing node for selectively receiving the photo charges outputted from the photodiodes; a reset transistor for resetting the single sensing node; and a drive transistor for outputting electrical signals corresponding to voltage levels of the single sensing node, and wherein the CMOS image sensor samples the electrical signals through the correlated double sampling and then outputs a final image value to an external device.

12 Claims, 5 Drawing Sheets

CMOS IMAGE SENSOR HAVING COMMON OUTPUTTING TRANSISTORS AND METHOD FOR DRIVING THE SAME

FIELD OF THE INVENTION

The present invention relates to a CMOS (Complementary Metal Oxide Semiconductor) image sensor; and, more particularly, to a pixel array of the CMOS image sensor and a method for driving the pixel array.

DESCRIPTION OF THE PRIOR ART

Generally, an image sensor is an apparatus to capture images using light sensing semiconductor materials. Since brightness and wavelength of light from an object are different in their amount according to the reflection area, electrical signals from pixels are different from one another. These electrical signals are converted into digital signals, which can be processed in a digital circuit, by an analogue-to-digital converter. Thus, the image sensor needs a pixel array having tens to hundreds of thousands of pixels, a converter for converting analogue voltages into digital voltages, hundreds to thousands of storage devices and so on.

Referring to FIG. 1, a conventional CMOS image sensor includes a control and interface unit 10, a pixel array 20 having a plurality of CMOS image sensing elements, and a single slope AD converter 30. The single slope AD converter 30 also includes a ramp voltage generator 31 for generating a reference voltage, a comparator (operational amplifier) 32 for comparing the ramp voltage with an analogue signal from the pixel array 20 and a double buffer 40.

The control and interface unit 10 controls the CMOS image sensor by controlling an integration time, scan addresses, operation modes, a frame rate, a bank and a clock division and acts as an interface with an external system. The pixel array 20 consisting of N×M unit pixels having excellent light sensitivity senses images from an object. Each pixel in the pixel array 20 includes a transfer transistor, a reset transistor and a select transistor. The single slope AD converter 30 converts analogue signals from the pixels array 20 into digital signals. This AD conversion is carried out by comparing the ramp voltage with the analogue signals. The comparator 32 searches for a point at which the analogue signals are the same as the falling ramp voltage with a predetermined slope. When the ramp voltage is generated and then starts falling, the control and interface unit 10 generated count signals to count the degree of the voltage drop. For example, the ramp voltage starting the voltage drop, the converted digital value may be "20" in the case where the analogue signals are the same as the falling ramp voltage at 20 clocks of the control and interface unit 10. This converted digital value is stored in the double buffer 40 as digital data.

Where the CMOS image sensor supports the correlated double sampling (hereinafter, referred to as a CDS) in order to generate images of high quality, unit pixels 100 and 120 in the pixel array include a photodiode and four transistors, respectively, as shown in FIG. 2. Also, the four transistors in the unit pixel 100 include a transfer transistor M21, a reset transistor M11, a drive transistor M31 and a select transistor M41. The transfer transistor M21 transfers photoelectric charges generated in the photodiode 101 to sensing node A, the reset transistor M11 resets sensing node A in order to sense a next signal, the drive transistor M31 acts as a source follower and the select transistor M41 outputs the digital data to an output terminal in response to the address signals.

In accordance with the CDS, the unit pixel 100 obtains a voltage corresponding to a reset level by turning on the reset transistor M11 and turning off the transfer transistor M21. Also, the unit pixel 100 obtains a data level voltage by turning off the transfer transistor M21 in a turn-off state of the reset transistor M11 and reading out photoelectric charges generated in the photodiode 101. An offset, which is caused by the unit pixel 100 and the comparator 32, may be removed by subtracting the data level from the reset level. This removal of the offset is essential to the CDS. That is, by removing an unexpected voltage in the unit pixel 100, it is possible to obtain a net image data value.

FIG. 3 shows a timing chart illustrating control signals to control transistors of the unit pixel shown in FIG. 2. The operation of the unit pixel 100 will be described with reference to FIG. 3.

1) In section "A" of FIG. 3, the transfer transistor M21 and the reset transistor M11 are turned on and the select transistor M41 is turned off, so that the photodiode 101 is fully depleted.

2) In section "B", the turned-on transfer transistor M21 is turned off, so that the photodiode 101 receives light from an object, generates photoelectric charges and integrates the photoelectric charges (Section "B" continues on regardless of the states of the reset transistor M11 and the selector transistor M41, until the transfer transistor M21 is again turned on).

3) In section "C", the reset transistor M11 and the transfer transistor M21 keep on a turn-on state and a turn-off state, respectively, and the select transistor M41 is turned on, so that reset voltage level is outputted through the select transistor M41 and the drive transistor M31 driven by the voltage level at sensing node A.

4) In section "D", the resent transistor M11 is turned off and then the reset voltage level generated in section "C" is settled.

5) In section "E", the reset voltage level of section "D" is sampled.

6) In section "F", the reset transistor M11 and the select transistor M41 keep on a turn-off state and a turn-on state, respectively, and the transfer transistor M21 is turned on, so that a data voltage level corresponding to photoelectric charges integrated in the photodiode 101 during the time of section "B", is transferred to the output terminal through the sensing node A, the drive transistor M31 and the select transistor M41.

7) In section "G", the transfer transistor M21 is turned off and then the data voltage level generated in section "F" is settled.

8) In section "H", the data voltage level of section "G" is sampled. The reset voltage level and the data voltage level sampled in sections "E" and "F", respectively, are outputted to the AD converter 30 (FIG. 1) and converted into two digital signals. The difference of two digital signals becomes an output image value of the CMOS image sensor with respect to an image inputted from the photodiode 101 (FIG. 1).

This conventional unit pixel employs four transistors per pixel in order to support the CDS, thus increasing the chip size of the CMOS image sensor.

SUMMARY OF THE INVENTION

It is, therefore, an object of the present invention to provide a CMOS image sensor that may reduce its chip area by decreasing the number of transistor for a pixel array and a method for driving the CMOS image sensor.

In accordance with an aspect of the present invention, there is provided a CMOS (Complementary Metal Oxide Semiconductor) image sensor, comprising: a unit pixel, the unit pixel including: a plurality of photodiodes receiving incident light form an object for generating photoelectric charges; a plurality of transferring means corresponding to the plurality of photodiodes, for transferring the photoelectric charges from the plurality of photodiodes to a single sensing node in response to control signals from an external controller, wherein the control signals controls the plurality of transferring means so that the photoelectric charges from the plurality of photodiodes are selectively transferred to the single sensing node; a common reset means for resetting the single sensing node, wherein the reset means determines reset levels of the single sensing node corresponding to each of the plurality of photodiodes; and a common outputting means for outputting electrical signals corresponding to voltage levels of the single sensing node, wherein the CMOS image sensor samples the electrical signals through the correlated double sampling and then outputs a final image value to the external device.

In accordance with another aspect of the present invention, there is provided a method for driving a CMOS image sensor to obtain a single outputted by the correlated double sampling from photoelectric charges generated in a plurality of photodiodes using a single sensing node, wherein the plurality of photodiodes are electrically coupled to the single sensing node, the method comprising the steps of: (a) generating the photoelectric charges in each photodiode; (b) resetting the single sensing node and obtaining a first electrical signal from the single sensing node; (c) transferring the photoelectric charges from one of the photodiodes to the single sensing node and then obtaining a second electrical signal from the single sensing node; (d) resetting the single sensing node and obtaining a third electrical signal from the single sensing node; and (e) transferring the photoelectric charges from another of the photodiode to the single sensing node and then obtaining a fourth electrical signal from the single sensing node.

In according with further another aspect of the present invention, there is provided a unit pixel in a CMOS (Complementary Metal Oxide Semiconductor) image sensor, comprising: a first photodiode for receiving light from an object and for generating and integrating photoelectric charges; a first transfer transistor coupled between the first photodiode and a single sensing node, for transferring the photoelectric charges generated in the first photodiode to the single sensing node, in response to a first control signal; a second photodiode for receiving light from the object and for generating and integrating photoelectric charges; a second transfer transistor coupled between the second photodiode and the single sensing node, for transferring the photoelectric charges generated in the second photodiode to the single sensing node, in response to a second control signal; a reset transistor coupled between a power supply and the single sensing node, for outputting the photoelectric charges stored in the single sensing node, in the response to a third control signal; a drive transistor coupled to the power supply, for acting as a source follower in response to an output of the single sensing node; and a select transistor coupled to the drive transistor, for outputting an image data driven by the drive transistor in response to address signals.

In accordance with still another aspect of the present invention, there is provided a method for driving a unit pixel which comprises a first photodiode for receiving light from an object and for generating and integrating photoelectric charges; a first transfer transistor coupled between the first photodiode and a single sensing node, for transferring the photoelectric charges generated in the first photodiode to the single sensing node, in response to a first control signal; a second photodiode for receiving light from the object and for generating and integrating photoelectric charges; a second transfer transistor coupled between the second photodiode and the single sensing node, for transferring the photoelectric charges generated in the second photodiode to the single sensing node, in response to a second control signal; a reset transistor coupled between a power supply and the single sensing node, for outputting the photoelectric charges stored in the single sensing node, in the response to a third control signal; a drive transistor coupled to the power supply, for acting as a source follower in response to an output of the single sensing node; and a select transistor coupled to the drive transistor, for outputting an image data driven by the drive transistor in response to address signals, the method comprising the steps of: (a) fully depleting the first and second photodiodes; (b) receiving light in the first and second photodiodes and generating photoelectric charges; (c) turning on the reset transistor, turning off the first and second transfer transistors and outputting a reset voltage level through the single sensing node, the drive transistor and the select transistor; (d) turning off the reset transistor, turning on the first transfer transistor and outputting a data voltage level of the photoelectric charges generated in the first photodiode through the single sensing node, the drive transistor and the select transistor; (e) turning on the reset transistor, turning off the first and second transfer transistors and outputting the reset voltage level through the single sensing node, the drive transistor and the select transistor; and (f) turning off the reset transistor, turning on the second transfer transistor and outputting a data voltage level of the photoelectric charges generated in the second photodiode through the single sensing node, the drive transistor and the select transistor.

BRIEF DESCRIPTION OF THE DRAWINGS

This invention can be more fully understood from the following detailed description when taken in conjunction with the accompanying drawings, in which.

DETAILED DESCRIPTION OF THE INVENTION

Hereinafter, the present invention will be described in detail with reference to the accompanying drawings.

Figure 2:
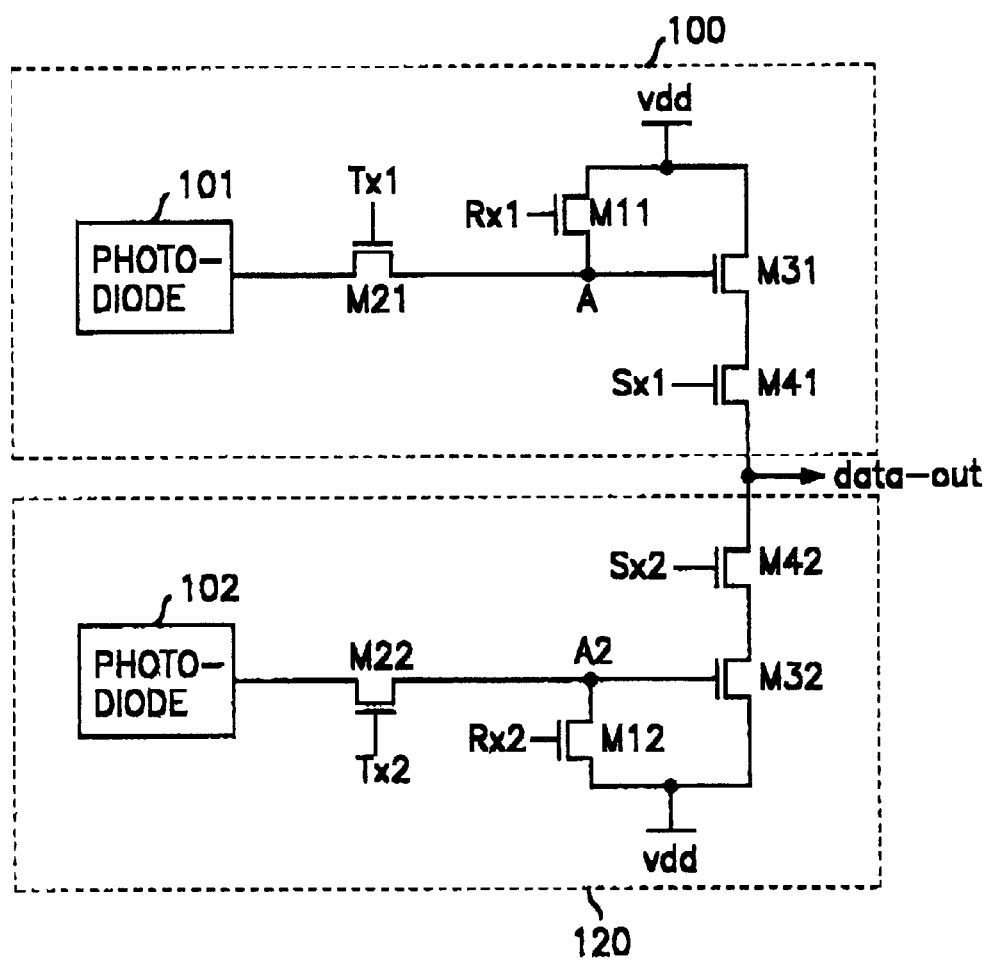
FIG. 2 is a circuit diagram illustrating a unit pixel according to the prior art.
Figure 3:
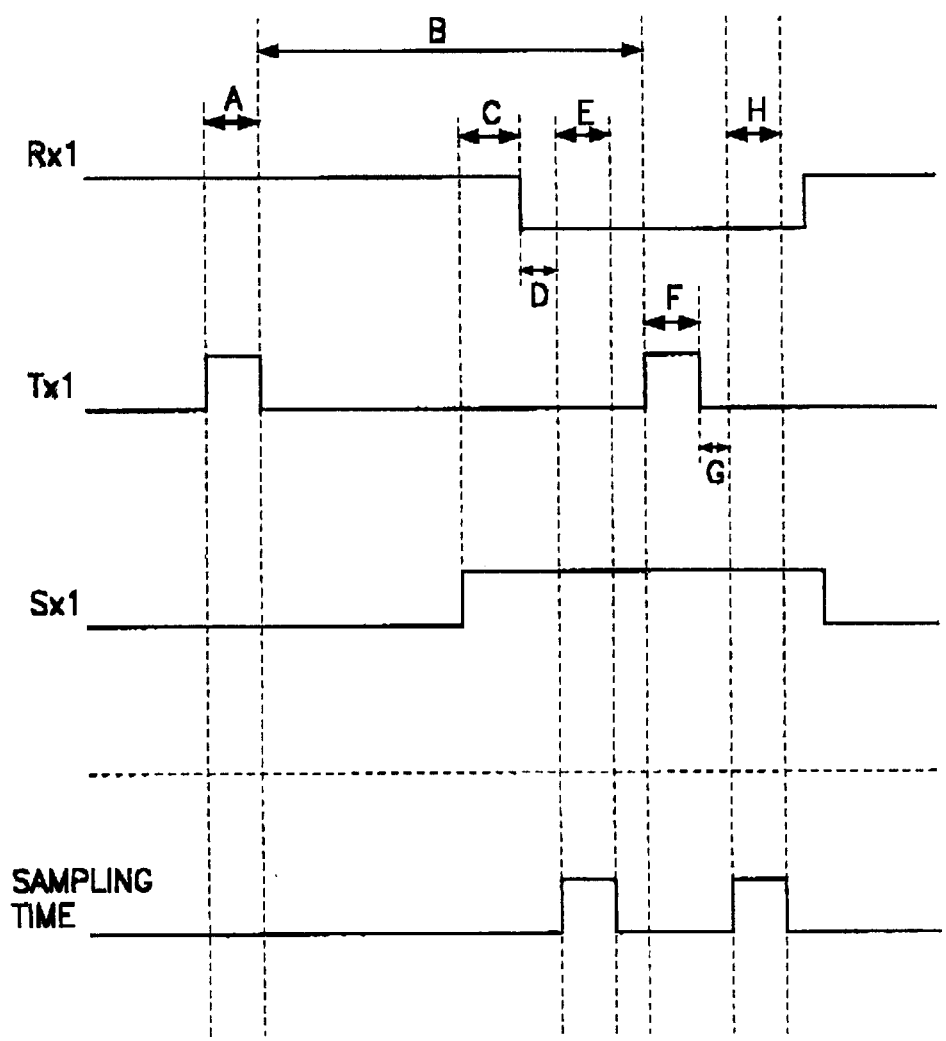
FIG. 3 shows a timing chart illustrating control signals to control transistors of the unit pixel shown in FIG. 2.
Figure 4:
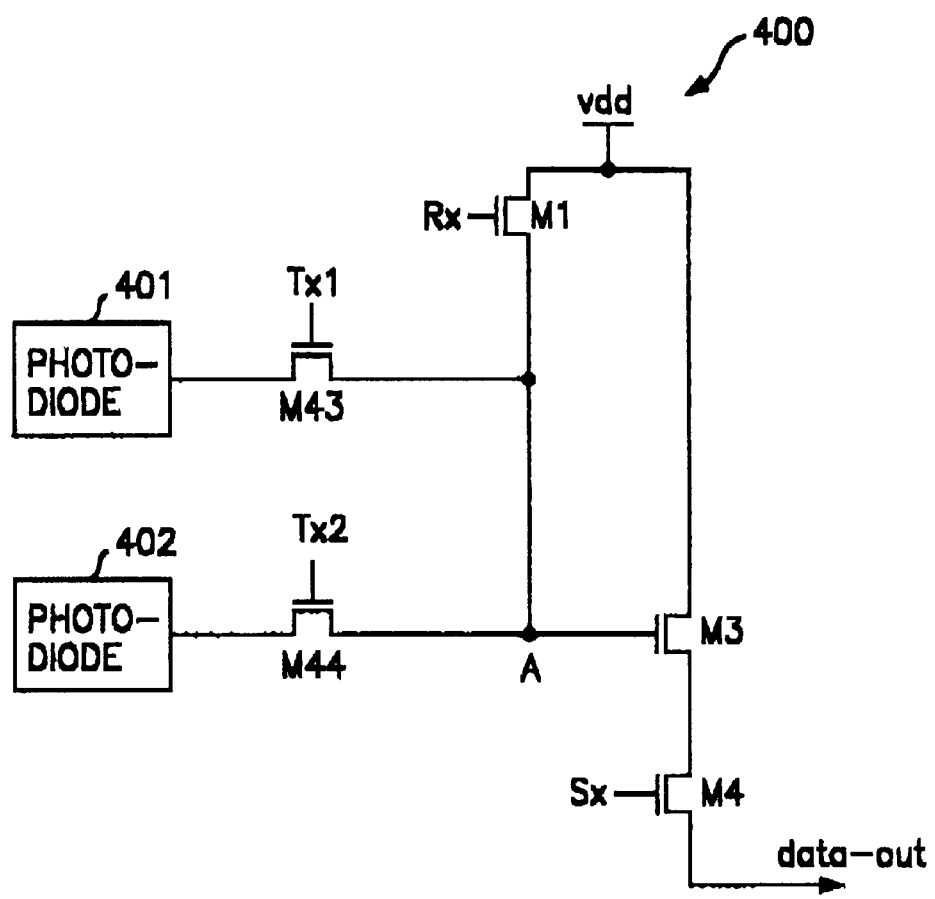
FIG. 4 is a circuit diagram illustrating a unit pixel according to the present invention.

Referring to FIG. 4, a unit pixel 400 may have the same effect as two unit pixels according to the prior art. While the unit pixels 100 and 120 in FIG. 2 includes two photodiodes and eight transistors, the unit pixel 400 according to the present invention includes two photodiodes and five transistors. A photodiode 401 and a photodiode 402 are connected to a transfer transistor M43 and a transfer transistor M44, respectively. The photodiodes 401 and 402 share a reset transistor M1, a drive transistor M3 and a select transistor M4. The photodiode 401 receives light from an object, generates photoelectric charges and integrates the photoelectric charges. The transfer transistor M43 is coupled between the photodiode 401 and single sensing node A, and transfers the photoelectric charges generated in the photodiode 401 to the single sensing node A in response to a control signal Tx1.

In similar, the photodiode 402 absorbs light from the object, generates photoelectric charges and integrates the photoelectric charges. The transfer transistor M44 is coupled between the photodiode 402 and the single sensing node A, and transfers the photoelectric charges generated in the photodiode 402 to the single sensing node A in response to a control signal Tx2.

The reset transistor M1 is coupled between a power supply Vdd and the single sensing node A and outputs the photoelectric charges on the single sensing node A in the response to a control signal Rx. The drive transistor M3 is coupled to the power supply Vdd and acts as a source follower in response to an output of the single sensing node A. The select transistor M4 is coupled to the drive transistor M3 and outputs image data in response to a control signal Sx which is produced by address signals.

Figure 5:
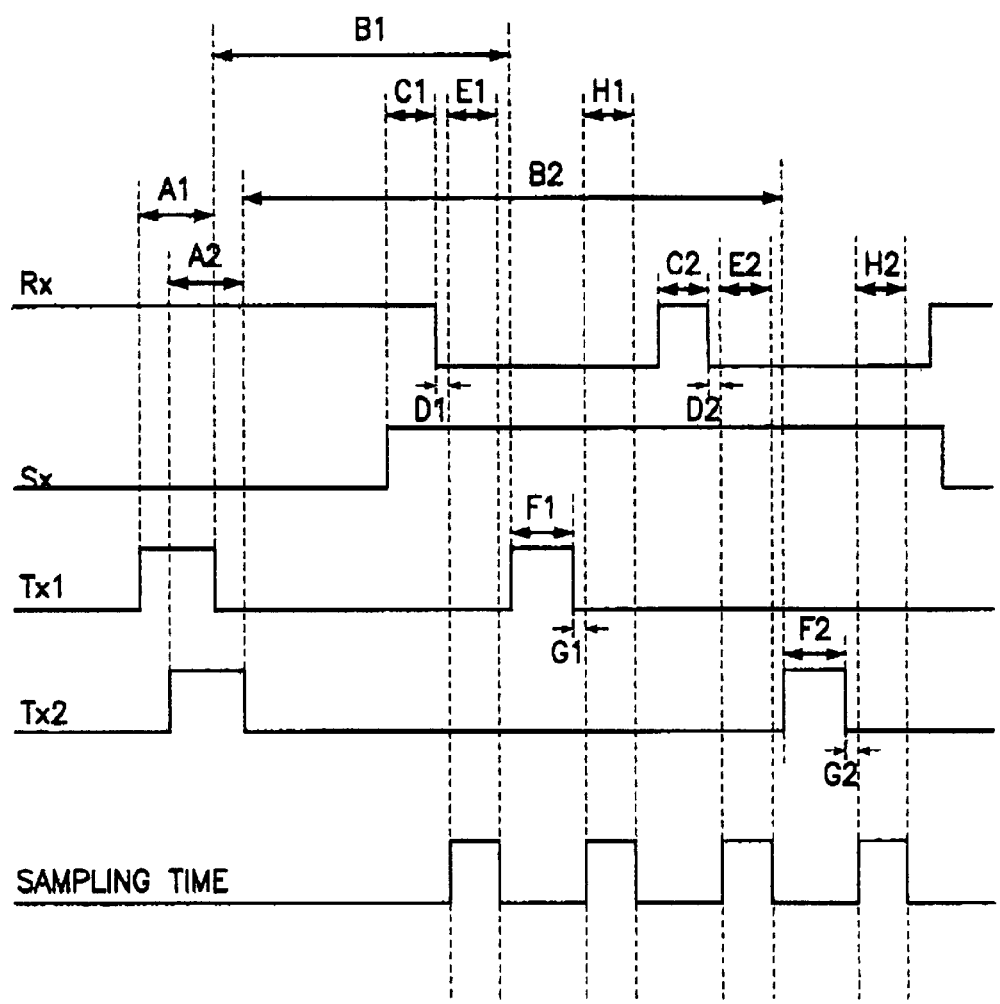
FIG. 5 shows a timing chart illustrating control signals to control transistors of the unit pixel shown in FIG. 4.

FIG. 5 shows a timing chart illustrating control signals to control transistors of a unit pixel shown in FIG. 4. The operation of the unit pixel will be described with reference to FIG. 5.

1) In section "A1", the transfer transistor M43 and the reset transistor M1 are turned on and the select transistor M4 is turned off, so that the photodiode 401 is fully depleted (In section "A1", the transfer transistor M43 keeps on a turn-on state, regardless of the state of the transfer transistor M44).

2) In section "B1", the turned-on transfer transistor M43 is turned off, so that the photodiode 401 generates photoelectric charges and integrates the photoelectric charges (Section "B1" continues on regardless of the states of the reset transistor M1, the transfer transistor M44 and the select transistor M4, until the transfer transistor M43 is again turned on).

3) In similar, in section "A2", the transfer transistor M44 and the reset transistor M1 are turned on and the select transistor M4 is turned off, so that the photodiode 402 is fully depleted (In section "A2", the transfer transistor M44 keeps on a turn-on state, regardless of the state of the transfer transistor M43).

4) In section "B2", the turned-on transfer transistor M44 is again turned off, so that the photodiode 401 generates photoelectric charges and integrates the photoelectric charges (Section "B2" continues on regardless of the states of the reset transistor M1, the transfer transistor M43 and the select transistor M4 until the transfer transistor M44 is again turned on).

5) In section "C1", the reset transistor M1, the transfer transistors M43 and M44 keep on a turn-on state, a turn-off state and a turn-off state, respectively, and the select transistor M4 is turned on, so that a reset voltage level is outputted through the select transistor M4 and the drive transistor M3 is driven by sensing node A.

6) In section "D1", the reset transistor M1 is turned off and then the reset voltage level generated in section "C1" is settled.

7) In section "E1", the reset voltage level of section "D1" is sampled.

8) In section "F1", the reset transistor M1 and the select transistor M4 keep on a turn-off state and a turn-on state, respectively, and the transfer transistor M43 is turned on, so that a data voltage level corresponding to the photoelectric charges integrated in the photodiode 401 during the time of section "B1", is transferred to the output terminal through the sensing node A, the drive transistor M3 and the select transistor M4.

9) In section "G1", the transfer transistor M43 is turned off and then the data voltage level generated in Section "F1" is settled.

10) In section "H1", the data voltage level of section "G1" is sampled.

11) In section "C2", the reset transistor M1, the transfer transistors M44 and M43 keep on a turn-on state, a turn-off state and a turn-off state, respectively, and the select transistor M4 is turned on, so that the reset voltage level is outputted through the select transistor M4 and the drive transistor M3 is driven by the sensing node A.

12) In section "D2", the reset transistor M1 is turned off and then the reset voltage level generated in section "C2" is settled.

13) In section "E2", the reset voltage level of section "D2" is sampled.

14) In section "F2", the reset transistor M1 and the select transistor M4 keep on a turn-off state and a turn-on state, respectively, and the transfer transistor M44 is turned on, so that a data voltage level corresponding to the photoelectric charges integrated in the photodiode 402 during the time of section "B2", is transferred to the output terminal through the sensing node A, the drive transistor M3 and the select transistor M4.

15) In section "G2", the transfer transistor M44 is turned off and then the data voltage level generated in section "F2" is settled.

16) In section "H2", the data voltage level of section "G2" is sampled.

In sections "A1" to "H1", an output image value of the CMOS image sensor is outputted with respect to an image inputted to the photodiode 401. Also, in sections "A2" to "H2", an output image value of the CMOS image sensor is outputted with respect to an image inputted to the photodiode 402.

Especially, sections "A1" and "A2", in which the photodiode 401 and 402 are fully depleted, may be overlapped each other, and also sections "B1" and "B2", in which the photoelectric charges are generated and integrated, may be overlapped each other. A depletion time and the integration time of photoelectric charges may be adjusted by the control of a turn-on and a turn-off for the transfer transistors M43 and M44.

Figure 1:
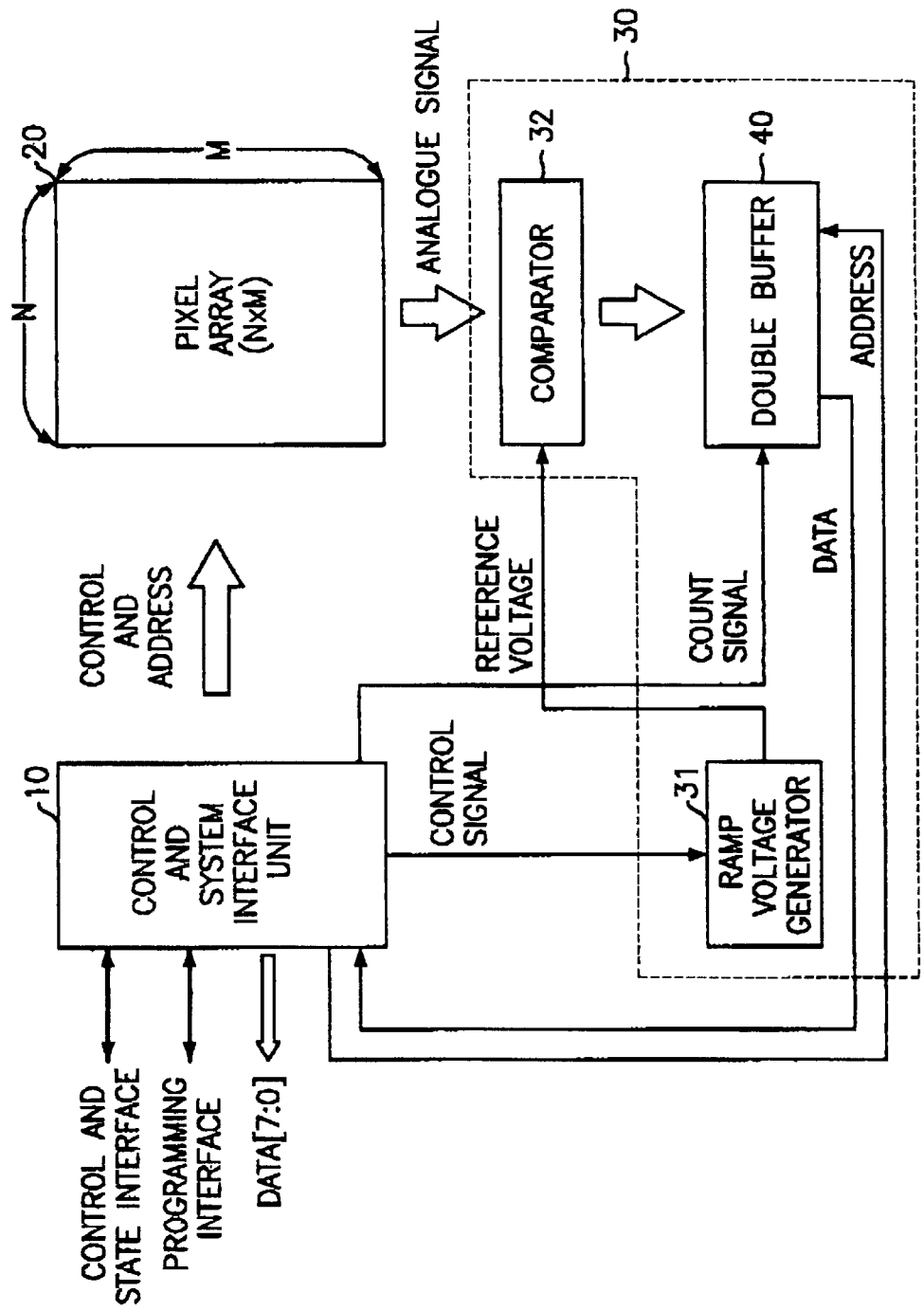
FIG. 1 is a block diagram illustrating a conventional CMOS image sensor.

As illustrated in the prior art, the reset voltage level and the data voltage level for the photodiode 101 sampled in sections "E1" and "H1", respectively, are outputted to the AD converter 30 (FIG. 1) and converted into two digital signals. The difference of two digital signals becomes an output image value of the CMOS image sensor with respect to an image inputted to the photodiode 101 (FIG. 1).

Also, the reset voltage level and the data voltage level for the photodiode 102 sampled in sections "E2" and "H2", respectively, are outputted to the AD converter 30 (FIG. 1) and converted into two digital signals. The difference of two digital signals becomes an output image value of the CMOS image sensor with respect to an image inputted to the photodiode 102 (FIG. 1).

Sections "D1", "G1", "D2" and "G2" are to remove a glitch error of the sensing node A which is caused in the process of a turn-on or a turn-off for the reset transistor M1 and the transfer transistors M43 and M44, the sensing node A may sample a level value in settled sections (sections "E1", "H1", "E2" and "H2") after sections "D1", "G1", "D2" and "G2".

The unit pixel according to the present invention is not limited to two photodiodes as described in an embodiment and may increase the number of photodiodes if necessary. Since the photodiodes of the unit pixel according to the present invention share the reset transistor M1, the drive transistor M3 and the select transistor M4, the unit pixel according to the present invention may reduce its chip area as compared with the unit pixel according to the prior art.

In the case where a plurality of photodiodes are coupled to the single sensing node, the common reset transistor, which is connected to the single sensing node, is turned on the basis of the photodiode in order to output the reset voltage level of the corresponding photodiode and the transfer transistor is turned on in order to output the data voltage level corresponding to the photoelectric charges generated in the photodiode. That is, after the reset voltage level of the corresponding photodiode is first outputted, the transfer transistor is turned on in order to output the data voltage level.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for driving a unit pixel which comprises a first photodiode for receiving light from an object and for generating and integrating photoelectric charges; a first transfer transistor coupled between the first photodiode and a single sensing node, for transferring the photoelectric charges generated in the first photodiode to the single sensing node, in response to a first control signal; a second photodiode for receiving light from the object and for generating and integrating photoelectric charges; a second transfer transistor coupled between the second photodiode and the single sensing node, for transferring the photoelectric charges generating in the second photodiode to the single sensing node, in response to a second control signal; a reset transistor coupled between a power supply and the single sensing node, for outputting the photoelectric charges stored in the single sensing node, in the response to a third control signal; a drive transistor coupled to the power supply, for acting as a source follower in response to an output of the single sensing node; and a select transistor coupled to the drive transistor, for outputting an image data driven by the drive transistor in response to address signals, the method comprising the steps of:

(a) fully depleting the first and second photodiodes;

(b) receiving light in the first and second photodiodes and generating photoelectric charges;

(c) turning on the reset transistor, turning off the first and second transfer transistors and turning on a selector transistor, and outputting a reset voltage level through the single sensing node, the drive transistor and the select transistor;

(d) turning off the reset transistor and then turning on the first transfer transistor with said reset transistor remaining off, and outputting a data voltage level of the photoelectric charges generated in the first photodiode through the single sensing node, the drive transistor and the select transistor;

(e) turning on the reset transistor, turning off the first transfer transistor and outputting the reset voltage level through the single sensing node, the drive transistor and the select transistor; and (f) turning off the reset transistor and then turning on the second transfer transistor with said reset transistor remaining off, and outputting a data voltage level of the photoelectric charges generated in the second photodiode through the single sensing node, the drive transistor and the select transistor.

2. The method as recited in claim 1, wherein the step (b) comprises the step of generating and integrating the photoelectric charges of the first photodiode, regardless of the states of the reset transistor, the second transfer transistor and the select transistor, while the first transfer transistor is turned off.

3. The method as recited in claim 2, wherein the method controls a depletion time and a photo charge generating and integrating time by adjusting a turn-on time and a turn-off time for the first and second transfer transistors.

4. The method as recited in claim 1, wherein the step (b) comprises the step of generating and integrating the photoelectric charges of the second photodiode, regardless the states of the reset transistor, the first transfer and the select transistor, while the second transfer transistor is turned off.

5. The method as recited in claim 1, wherein the step (c) further comprises the steps of:

turning off the reset transistor and settling the reset voltage level; and sampling the settled reset voltage level.

6. The method as recited in claim 5, wherein the sampled reset voltage level is outputted to an analogue-to-digital converter so that the sampled reset voltage level is converted into a digital signal.

7. The method as recited in claim 1, wherein the step (d) further comprises the steps of:

turning off the first transfer transistor and settling the data voltage level; and sampling the settled data voltage level.

8. The method as recited in claim 7, wherein the sampled data voltage level is outputted to an analogue-to-digital converter so that the sampled data voltage level is converted into a digital signal.

9. The method as recited in claim 1, wherein the step (e) further comprises the steps of:

turning off the reset transistor and settling the reset voltage level; and sampling the settled reset voltage level.

10. The method as recited in claim 9, wherein the sampled reset voltage level is outputted to an analogue-to-digital converter so that the sampled reset voltage level is converted into a digital signal.

11. The method as recited in claim 1, wherein the step (f) further comprises the steps of:

turning off the second transfer transistor and settling the data voltage level; and sampling the settled data voltage level.

12. The method as recited in claim 11, wherein the sampled data voltage level is outputted to an analogue-to-digital converter so that the sampled data voltage level is converted into a digital signal.

* * * * *